(12) United States Patent (10) Patent No.: US 11,403,668 B2
Kini et al. (45) Date of Patent: Aug. 2, 2022

(54) MULTITASK TRANSFER LEARNING FOR OPTIMIZATION OF TARGETED PROMOTIONAL PROGRAMS

(71) Applicant: Target Brands, Inc., Minneapolis, MN (US)

(72) Inventors: Venkataramana Bantwal Kini, Sunnyvale, CA (US); Shilad Sen, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/022,914

(22) Filed: Sep. 16, 2020

(65) Prior Publication Data

US 2021/0133807 A1 May 6, 2021

Related U.S. Application Data

(60) Provisional application No. 62/928,190, filed on Oct. 30, 2019.

(51) Int. Cl.
*G06N 3/00* (2006.01)
*G06Q 30/02* (2012.01)
*G06N 3/08* (2006.01)

(52) U.S. Cl.
CPC .......... *G06Q 30/0254* (2013.01); *G06N 3/08* (2013.01); *G06Q 30/0247* (2013.01)

(58) Field of Classification Search
CPC ... G06Q 30/0254; G06Q 30/0247; G06N 3/08
See application file for complete search history.

(56) References Cited

U.S. PATENT DOCUMENTS

| | | | |
|---|---|---|---|
| 10,438,216 B1 * | 10/2019 | Parekh | G06N 20/00 |
| 2009/0198602 A1 * | 8/2009 | Wang | G06Q 30/02 |
| | | | 705/35 |
| 2010/0235241 A1 * | 9/2010 | Wang | G06Q 30/0255 |
| | | | 705/14.66 |
| 2013/0332275 A1 * | 12/2013 | Takami | G06F 16/9535 |
| | | | 705/14.53 |
| 2014/0244361 A1 * | 8/2014 | Zhang | G06Q 30/0204 |
| | | | 705/7.33 |
| 2015/0143395 A1 | 5/2015 | Reisman | |

(Continued)

FOREIGN PATENT DOCUMENTS

| | | | | |
|---|---|---|---|---|
| AU | 2011279407 B2 * | 7/2013 | | G06Q 30/02 |
| JP | 2015219611 A * | 12/2015 | | |

OTHER PUBLICATIONS

Das et al., Maximizing Profit Using Recommender Systems, Brown University, Aug. 25, 2009, 5 Pages.

(Continued)

*Primary Examiner* — Ilana L Spar
*Assistant Examiner* — Allan J Woodworth, II
(74) *Attorney, Agent, or Firm* — Merchant & Gould P.C.

(57) ABSTRACT

Multitask learning is applied to predict a customer's propensity to purchase an item within a particular category of items. Then, the network is tuned using transfer learning for a specific promotional campaign. Retail revenue and promotional revenue are jointly optimized, conditioned on customer trust. Accordingly, a particular promotional program may be selected that is specific to the user.

21 Claims, 7 Drawing Sheets

(56) References Cited

U.S. PATENT DOCUMENTS

| | | | |
|---|---|---|---|
| 2015/0371279 A1* | 12/2015 | Gerard | H05K 9/0041 |
| | | | 705/14.66 |
| 2017/0316450 A1* | 11/2017 | Kobylkin | G06Q 10/067 |
| 2018/0084078 A1* | 3/2018 | Yan | H04L 67/327 |
| 2019/0385080 A1* | 12/2019 | Wu | G06N 20/00 |
| 2020/0090048 A1 | 3/2020 | Pascanu et al. | |
| 2020/0167448 A1* | 5/2020 | Modarresi | G06K 9/6271 |
| 2021/0110429 A1* | 4/2021 | Keng | G06Q 30/0244 |
| 2021/0264195 A1* | 8/2021 | Ingram | G06T 19/006 |

OTHER PUBLICATIONS

Bansal et al., Ask the GRU: Multi-task Learning for Deep Text Recommendations, College of Information and Computer Sciences, University of Massachusetts Amherst, 2016, 8 Pages.

Zhang et al., Deep Learning based Recommender System: A Survey and New Perspectives, ACM Computing Surveys, vol. 1, No. 1, Article 1, Publication date: Jul. 2018; 35 Pages.

Elkahky et al., A Multi-View Deep Learning Approach for Cross Domain User Modeling in Recommendation Systems, International World Wide Web Conference Committee (IW3C2), May 18-22, 2015; 11 Pages.

Lian et al., CCCFNet: A Content-Boosted Collaborative Filtering Neural Network for Cross Domain Recommender Systems, International World Wide Web Conference Committee (IW3C2), Apr. 3-7, 2017; 2 Pages.

Pan et al., Transfer Learning in Collaborative Filtering for Sparsity Reduction, Twenty-Fourth (AAAI) Conference, Association for the Advancement of Artificial Intelligence, 2010, 6 Pages.

\* cited by examiner

MULTITASK TRANSFER LEARNING FOR OPTIMIZATION OF TARGETED PROMOTIONAL PROGRAMS

CROSS-REFERENCE TO RELATED APPLICATIONS

The present application claims priority from U.S. Provisional Patent Application No. 62/928,190, filed on Oct. 30, 2019, the disclosure of which is hereby incorporated by reference in its entirety.

BACKGROUND

E-commerce has taken increasingly sophisticated approaches to increase short term revenue and long-term customer loyalty. Much of the early e-commerce research in the fields of recommender systems focused narrowly on short-term customer satisfaction. More recently, e-commerce research has become more deeply connected to business goals by considering retail revenue, the total price consumers pay for goods, and retail profit, the margin between a retailer's revenue and their internal cost for a good. Newer research takes a longer-term view of customer engagement by studying how customers build trust in an e-commerce system through recommendations and analyzing the effect this has on customer loyalty.

Advertising and promotion provide a flexible mechanism to maintain, increase and diversify customer purchasing behavior. While advertisements increase visibility of a product and persuade customers of a product's value, promotions offer monetary incentives to purchase a product (e.g. "buy one, get one free"). By encouraging customers to expand the variety of products they purchase through a retailer advertising and promotions (referred to herein as "promotion") can increase retail revenue and promote loyalty. Through offers that lower the costs for consumers, retailers can increase trust and loyalty in exchange for reductions in profit on certain items. Because of the flexibility of these mechanisms, a great deal of research in "targeted advertising", "behavioral targeting", and others has sought to develop algorithms for personalized advertising based on a customer's past retail interactions.

Perhaps the most widely known platforms for digital promotion are not retail companies, but technology companies such as Google and Facebook who operate advertising marketplaces where different manufacturers compensate the platform for deploying an advertising campaign and achieving specific goals. A great deal of research has sought to develop bidding algorithms to optimize the revenue operators received for advertising. Examples of such research include: Jun Wang and Shuai Yuan. 2015. *Real-time bidding: A new frontier of computational advertising research*. PROCEEDINGS OF THE EIGHTH ACM INTERNATIONAL CONFERENCE ON WEB SEARCH AND DATA MINING. ACM, 415-416. Yong Yuan, Feiyue Wang, Juanjuan Li, and Rui Qin. 2014. *A survey on real time bidding advertising*. IN PROCEEDINGS OF 2014 IEEE INTERNATIONAL CONFERENCE ON SERVICE OPERATIONS AND LOGISTICS, *and Informatics*. IEEE, 418-423.

Although not specific to advertising or promotions, multitask learning is extensively studied in different contexts. Broadly, there are two kinds of multitask learning: hard parameter sharing and soft parameter sharing, depending on whether the most parameters are shared across all tasks or not. In N. Xia and G. Karypis, *Multi-task learning for recommender system*. PROCEEDINGS OF 2ND ASIAN CONFERENCE ON MACHINE LEARNING (2010), an early application of multitask learning is introduced that focuses on finding similar users and performs support vector regression on user-item pairs together with their ratings. More recently, deep learning techniques that use multitask recommender systems are proposed. The approach proposed in G. Chen et al., *Learning Recommender Systems from Multi-Behavior Data*, PREPRINT OF IEEE TRANSACTIONS ON KNOWLEDGE AND DATA ENGINEERING (2018) develops multitask learning on top of LSTM layers. However, in that paper, the multibehavior problem is addressed in a multitask setting of neural networks. Specifically, a cascaded structure is proposed in that reference, in which the network is used to capture dependencies found in the data.

While some recommender systems utilize multitask learning, because such systems do not apply multitask learning to the promotional process, they are tuned differently and have different objectives.

Additionally, there exist a variety of types of transfer learning, in which knowledge gained in one context may be applied to another (sometimes related) context. There exist a number of different approaches of transfer learning, for example: transfer via constraints, regularization, and prediction rules. Transfer via prediction rule uses prior content knowledge directly in predicting user affinity. Transfer via regularization uses content embeddings to regularize of user/item parameters. Transfer via constraints incorporates auxiliary data through some constraints. However, none of these transfer learning processes are used to tune existing neural networks, particularly as applied in the context of recommender systems.

Accordingly, there exists no system for enhancing promotion recommendations on a per-user basis that utilizes multitask learning in a meaningful way to improve recommendations for promotions to be offered to a particular user.

SUMMARY

In one example, a computer-implemented method includes training a base model with existing customer records describing purchases within an item collection having a plurality of categories, the existing customer records being associated with items across the plurality of categories, the base model comprising a neural network. The method further includes tuning the base model for at least one specific promotion task via a transfer learning process to generate relevancy predictions for one or more of the plurality of categories, the relevancy predictions being specific to a particular user, and combining the relevancy predictions and advertising revenue to estimate overall revenue.

In a further example, a promotion generation system includes a computing system including a processor operatively coupled to a memory subsystem. The memory subsystem stores customer records and instructions which, when executed, cause the computing system to: train a base model with the customer records, the customer records describing purchases within an item collection having a plurality of categories and being associated with items across the plurality of categories, the base model comprising a neural network; tune the base model for at least one specific promotion task via a transfer learning process to generate relevancy predictions for one or more of the plurality of categories, the relevancy predictions being specific to a particular user; and combine the relevancy predictions and advertising revenue to estimate overall revenue.

In a still further example, a promotion generation system includes a computing system including a processor operatively coupled to a memory subsystem. The memory subsystem stores customer records and instructions which, when executed, cause the computing system to: train a base model with the customer records, the customer records describing purchases within an item collection having a plurality of categories and being associated with items across the plurality of categories, the base model comprising a neural network; tune the base model for at least one specific promotion task via a transfer learning process to generate relevancy predictions for one or more of the plurality of categories, the relevancy predictions being specific to at least one particular user; combine the relevancy predictions and advertising revenue to estimate overall revenue associated with the at least one particular user and the at least one specific promotion task; and transmit an instruction to an online retail platform to automatically present a promotion associated with the at least one specific promotion task to the at least one particular user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
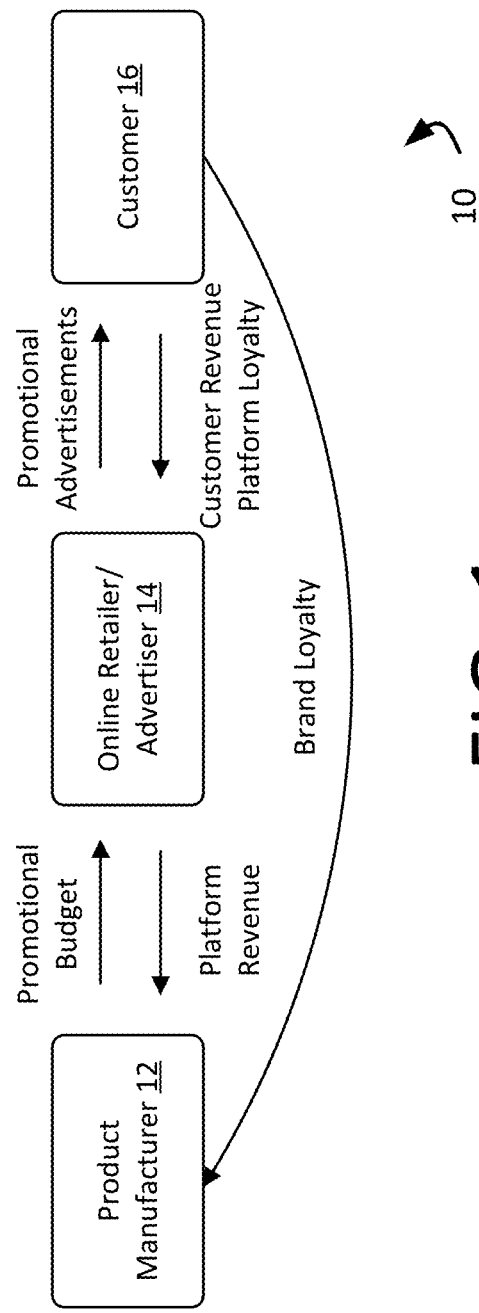
FIG. 1 illustrates an entity-relationship diagram for online retail promotion platforms within which aspects of the present disclosure may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Advertising and promotion provide a flexible mechanism to maintain, increase and diversify customer purchasing behavior. While advertisements increase visibility of a product and persuade customers of a product's value, promotions offer monetary incentives to purchase a product (e.g. "buy one, get one free"). Besides existing platforms that implement bidding processes for retailers to sell items online (e.g., Google, Facebook), at the intersection of retail and promotion platforms lies various online retailers, who operate both advertising platforms and also serve as retailers who sell products (e.g., Amazon.com, Wal-Mart, Target Corp.). While these retailers sell goods directly to consumers, they also collect revenue for sponsored advertising and promotion by serving as an advertising platforms for manufacturers of goods. For these online retailers, the business impact of a promotional campaign includes each of 1) the marginal retail revenue derived from customer purchases, 2) the promotional revenue, which captures direct advertising payments from a manufacturer to the retailer for delivering ads promoting their products, and 3) the change (positive or negative) in customer loyalty as a result of the advertising campaign.

In accordance with the various embodiments discussed herein, the present disclosure is generally related to application of a multitask transfer learning approach to jointly optimize customer trust, retail revenue, and promotional revenue. Multitask learning is applied to predict a customer's propensity to purchase items within fine-grained categories. Then, the network is tuned using transfer learning for a specific promotional campaign. Finally, retail revenue and promotional revenue are jointly optimized, conditioned on customer trust.

The above approach is particularly applicable for recommending promotions to retailers who also operate advertising marketplaces, and operates to balance customer trust and total revenue (where total revenue corresponds not just to sales revenue, but also advertising revenue in circumstances where third party products are promoted). The methods and systems described herein are adaptable to the changing requirement and revenue structures for various advertising campaigns. In large retailers, optimizing thousands of promotional campaigns that are constantly changing for hundreds of millions of customers represent represents a clear algorithmic challenge. To address these scalability needs, the methods and systems described herein use transfer learning to separate computation of a base model from computation for fine-tuning and advertising/retail revenue optimization, thereby allowing for customized promotion recommendation generations per user at a large scale (i.e., for a large number of customers).

In particular example embodiments, deep learning, particularly multi-task learning and transfer learning, are used. In such a combined process, referred to herein as deep transfer learning, a deep neural network is developed for a first task and later adapted to one or more new tasks. The first task (i.e. the "base task") is trained with a large amount of data while the second task benefits from increased generalization with less training data. Transfer learning has been successfully applied to image processing, where object recognition models trained on huge datasets can be customized to tasks such as object segmentation or landmark recognition with little training data. Such an application is extended by the approach discussed herein within the promotional context.

In example embodiments, a model for the base task uses a customer's historical purchase and online viewing behavior to predict that customer's future spending across fine-grained categories (e.g. "men's athletic socks"). This model is then fine-tuned for specific promotion tasks related to products, brands, etc. A multitask framing is used for generating promotion recommendations, where each output (i.e. category spend) is modeled as a separate independent task.

The overall approach involves a three step process. In the first step, the base model is trained using a large number of samples (e.g., hundreds of millions of samples) to predict purchasing behavior within fine grained categories (e.g., "bath robes"). The second step uses transfer learning to adapt the base model to a particular set of advertising promotions. The third step combines the relevancy predictions and advertising revenue to estimate overall revenue.

It is in this context that the overall methods and systems are described. Following description of the overall promotional optimization process, experimental data is provided illustrating effectiveness of the optimized promotions that are selected, illustrating significant improvements in promotion effectiveness.

Referring to FIG. 1, a relationship diagram 10 illustrates relationships in promotional systems. In this context, a product manufacturer 12 interacts with an online retailer/advertiser 14, who in turn interacts with a customer 16. The retailer 14 sells goods directory to the customer 16, while collecting revenue both from the customer and from the product manufacturer, e.g., for sponsored advertising and promotion by serving as an advertising platforms for such product manufacturers 12. Thus, for the retailer 14, the business impact of a promotional campaign is comprised of 1) the marginal retail revenue derived from customer purchases, 2) the promotional revenue, which captures direct ad payments from a manufacturer to the retailer for delivering ads promoting their products, and 3) the change (positive or negative) in customer loyalty as a result of the advertising campaign.

Figure 2:
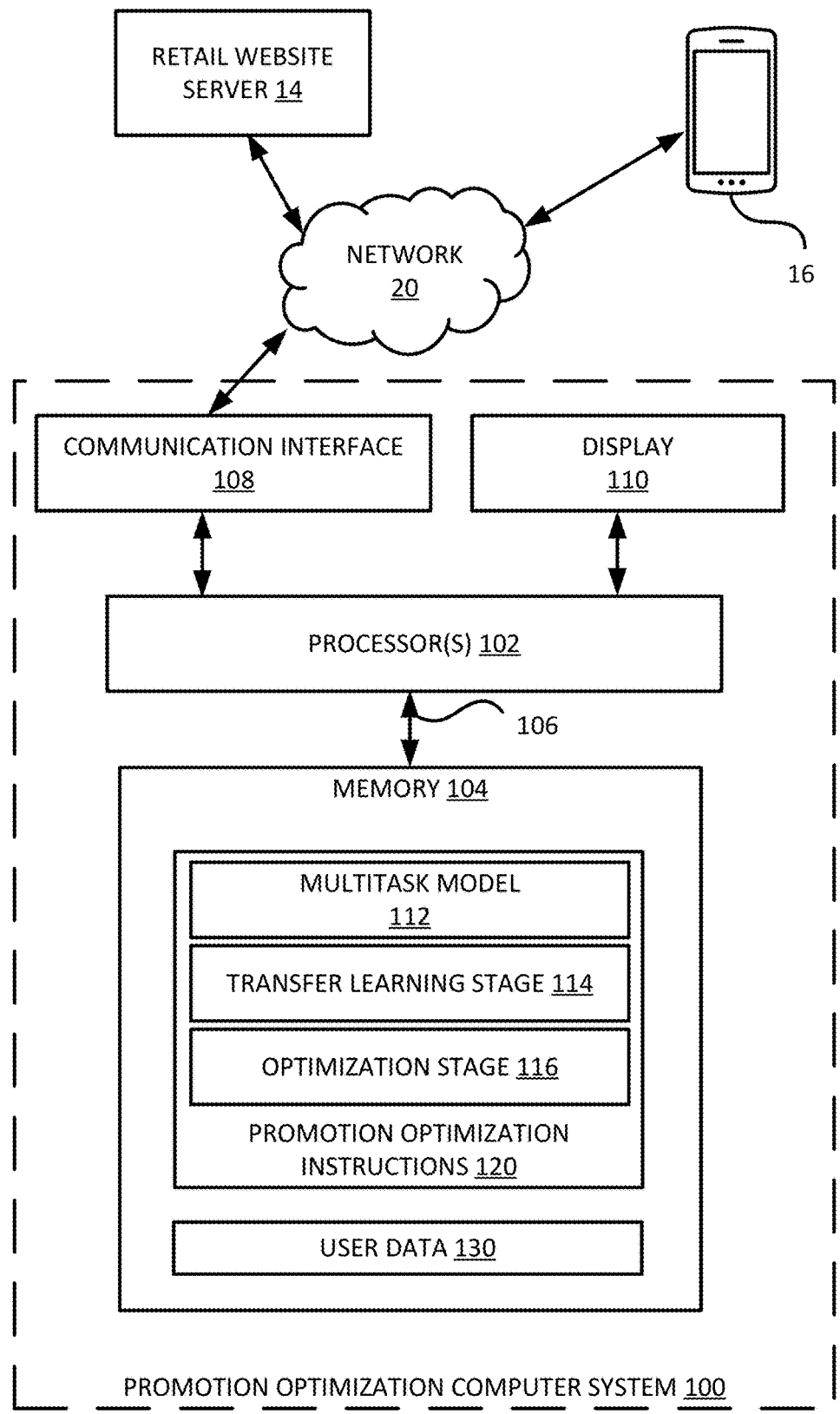
FIG. 2 illustrates a network including a promotion optimization computing system that utilize multitask learning, according to an example embodiment.

Referring to FIG. 2, a promotion recommendation system is depicted that includes a promotion optimization computer system 100. In this context, a customer 16 interacts with a retailer 14 via a retail website server. The retail website server presents items to a user device, which displays such items to the user via either a browser or application. The promotion optimization computer system 100 provides recommended promotions for display via the retail website to the customer 16.

In the example shown, the promotion optimization computer system 100 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 104 stores promotion optimization instructions 120, discussed in further detail below. The computing system 100 can also include a communication interface 108 configured to receive and transmit data, for example to access data in an external database, or to provide such item recommendations to a retail web server 14 for presentation to a user device 16. Additionally, a display 110 can be used for viewing optimized promotion information generated for a particular user and classification that is generated by the promotion optimization instructions 120.

In the embodiment shown, the memory 104 stores promotion optimization instructions 120 and user data 130. The promotion optimization instructions 120 can include, for example, a multitask model 112, a transfer learning stage 114, and an optimization stage 116.

The multitask model 112 generally maintains a convolutional neural network that is trained using the user data 130. In example embodiments, the multitask model 112 trains the convolutional neural network using a predetermined amount of past user data from among the user data 130. This forms a base model that can be used in assessment of promotion effectiveness in a general case, as its output is an output matrix of propensity scores for each user (customer) in each category, with each propensity score corresponding to a likelihood of the user will purchase from the category. It is noted in this context, that each category is a fine-grained category, rather than a general category in which a large number of items and item types may be classified.

The transfer learning stage 114 modifies the base model by replacing a final stage of the convolutional neural network that is trained during the multitask model 112 with a newly—trained layer that is specific to a particular promotion. In this way, that final layer which is a task- or category-specific layer is replaced with a layer that outputs campaign-specific output variables. For example, a final layer may be trained using a different vector in which data associated with a particular promotion may be used to train that layer; that data may be associated with prices of specific items (e.g., items associated with a particular brand, etc. that may be the subject of the promotion) and associated with any particular users (e.g., in a user-brand dataset that is included in the input matrix to such a model) such that, upon application of the modified final layer (after transfer learning) the output matrix is modified to be specific to the particular promotion or promotions under consideration.

The optimization stage 116 performs an optimization process to maximize overall revenue (i.e., both sales revenue and ad revenue for third party products) conditioned on maintenance of customer trust in the retailer. In general, the transfer learning model does not consider sponsorship revenue from a brand to the retailer for a promotion. In this stage, advertising campaigns are selected for each customer to balance total revenue, which is the sum of retail revenue (from the customer) and promotional revenue (from the sponsor/third party). One example implementation of an optimization stage is discussed in further detail below.

The user data 130 generally corresponds to a collection of individual user data for known users over a period of time, as interacting with an item collection that includes items from among the collection of fine-grained categories. The user data can include customer purchase data, but may also include other types of item interactions, such as the number of times the user may click on or otherwise elect an item for viewing, in combination with purchase data. Other types of data describing customer behavior may be included as well.

A particular example architecture illustrating processing of user data using promotion optimization instructions 120 is illustrated in greater detail below, in conjunction with FIG. 4.

Figure 3:
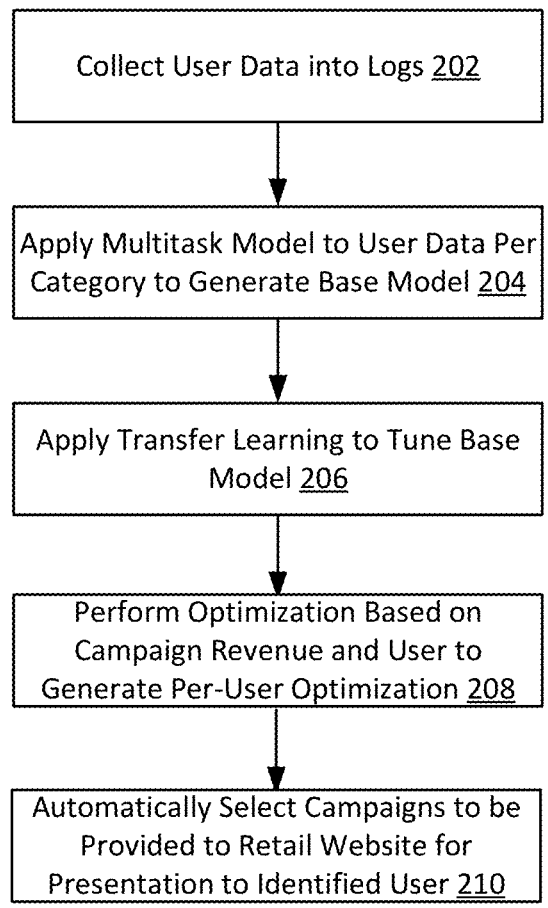
FIG. 3 illustrates a method of applying multitask transfer learning to optimize advertisement and promotion selections, according to an example embodiment.

FIG. 3 illustrates a method of applying multitask transfer learning to optimize advertisement and promotion selections, according to an example embodiment. The method 200 can be used, for example, to perform the promotion identification described above in connection with FIGS. 1-2.

The method 200 generally includes receipt of customer data (step 202). The customer data can include any of a variety of types of data describing customer interactions with items. For example the customer data may include logs of instances where a customer interacted with an item (e.g., either selected or purchased an item).

In the embodiment shown, the method 200 includes applying a multitask model to user data on a per category basis to generate a base model (step 204). This can be performed by the multitask model 112 of FIG. 2. In example embodiments, the base model is trained on a dataset according to a loss function:

$$\text{Loss}(X, Y) = \frac{1}{MK} \sum_{u=1}^{M} \sum_{i=1}^{K} (f(X_{ui}) - Y_{ui})^2$$

wherein M is a total number of customers, K is a number of categories being predicted, and $(f(X_{ui})$ is an output of a neural network $f$ for customer u and category i given an input $X_{ui}$. The neural network incorporates an embedding layer for each input feature and it is multi-task in that it simultaneously predicts the entire output feature space (for the data 130, this is each category score, e.g., air hockey tables, robes, men's athletic socks, etc.)

The method 200 further includes applying transfer learning to tune the base model (step 206). This can include, for example, replacing a last layer of the convolutional neural network generated using the multitask model with a modified last layer that is trained using promotion-specific data. For example the last layer may be trained from data associated with outer users who may have been exposed to a particular promotion, or may be trained using other identified promotions that might be considered similar to the promotion(s) under consideration.

The method 200 also includes performing an optimization process based on campaign revenue and the identity of the user to generate a per-user optimization of promotional program selections (step 208). This may be accomplished in a number of ways. In an example embodiment, this includes combining the relevancy predictions and advertising revenue to estimate overall revenue. As noted above, the optimization process is configured to maximize overall revenue (i.e., both sales revenue and ad revenue for third party products) conditioned on maintenance of customer trust in the retailer. In particular, in an example embodiment, total revenue is derived from an overall yield equation:

$$o_{u,i} = p_{u,i} \sqrt{\frac{\left(\frac{1}{\tau^2} - 1\right) \sum_j \hat{y}_{u,i}^2}{\sum_j p_{u,j}^2}} + \frac{\hat{y}_{u,i}}{\tau}$$

In this context, $\hat{y}_{u,i}$ represents a score generated by a second stage transfer model, $p_{u,i}$ is constant for a user u and promotional campaign i, and $\tau$ is a selectable constant that ranges between 0 and 1.0.

The $\tau$ constant captures the maximum fraction of recommendations that can be rejected by the customer while still maintaining their trust. A $\tau$ value near 0.0 means that a retailer will lose trust if the customer rejects any recommendations are rejected by the consumer. In this case, high-promotional revenue items should only be introduced if a recommender system is confident the user will like the item. On the other hand, $\tau$ values closer to 1.0 indicates the customer can reject most recommendations while still retaining trust. Thus, a system can suggest many high-revenue items without sacrificing trust.

This produces a single expected value for each advertising campaign that balances promotional revenue, retail revenue, and trust. Thus, a retailer may select a $\tau$ corresponding to their desired level of user trust and calculate the values of $o_{u,i}$ for each user u and promotional campaign i and assign users to campaigns according to certain business rules (e.g. a required number of ad impressions).

Once an identified value is generated for a particular advertising campaign for a given user, one or more advertising campaigns may be automatically selected (step 210) for that user given the revenue maximization goals, conditioned on trust. The advertising campaigns may be identified to a retail website (e.g., by transmitting an identifier of the specific retail campaigns and user (customer) for which those campaigns are selected) so that the campaigns may be presented by the retail website to the identified user (customer).

In example embodiments, the automatic selection of the advertising campaign can take any of a variety of forms. In example embodiments, an online promotion may be presented to the user automatically within a predetermined period of time, e.g., either on a website of a retailer or within a mobile application hosting online retail sales activities. In general, because transfer learning is applied to determine an effect of a particular promotion using a model of user behavior as to other categories of activity, a user's reaction to the particular promotion may be better predicted. This may not otherwise be possible for promotions which have little to no history as applied to a particular user or user group, and therefore combination of user actions with transfer learning to adjust for effects of the particular promotion in other contexts. Additionally, because a retailer is able to automatically present particular promotions to users via its own sales channels, promotional revenue may be balanced against customer trust during optimization to maintain trust of the user through the presentation of the selected promotion. Accordingly, accuracy of promotions is increased (in terms of likelihood of the promotion being of interest), and the efficiency by which a promotion can be identified to be presented to that user is improved as well. These advantages allow for convenient selection of a particular promotion from among a set of candidate promotions for a particular user, or may alternatively allow selection between a number of users to determine which user is presented the particular promotion.

Figure 4:
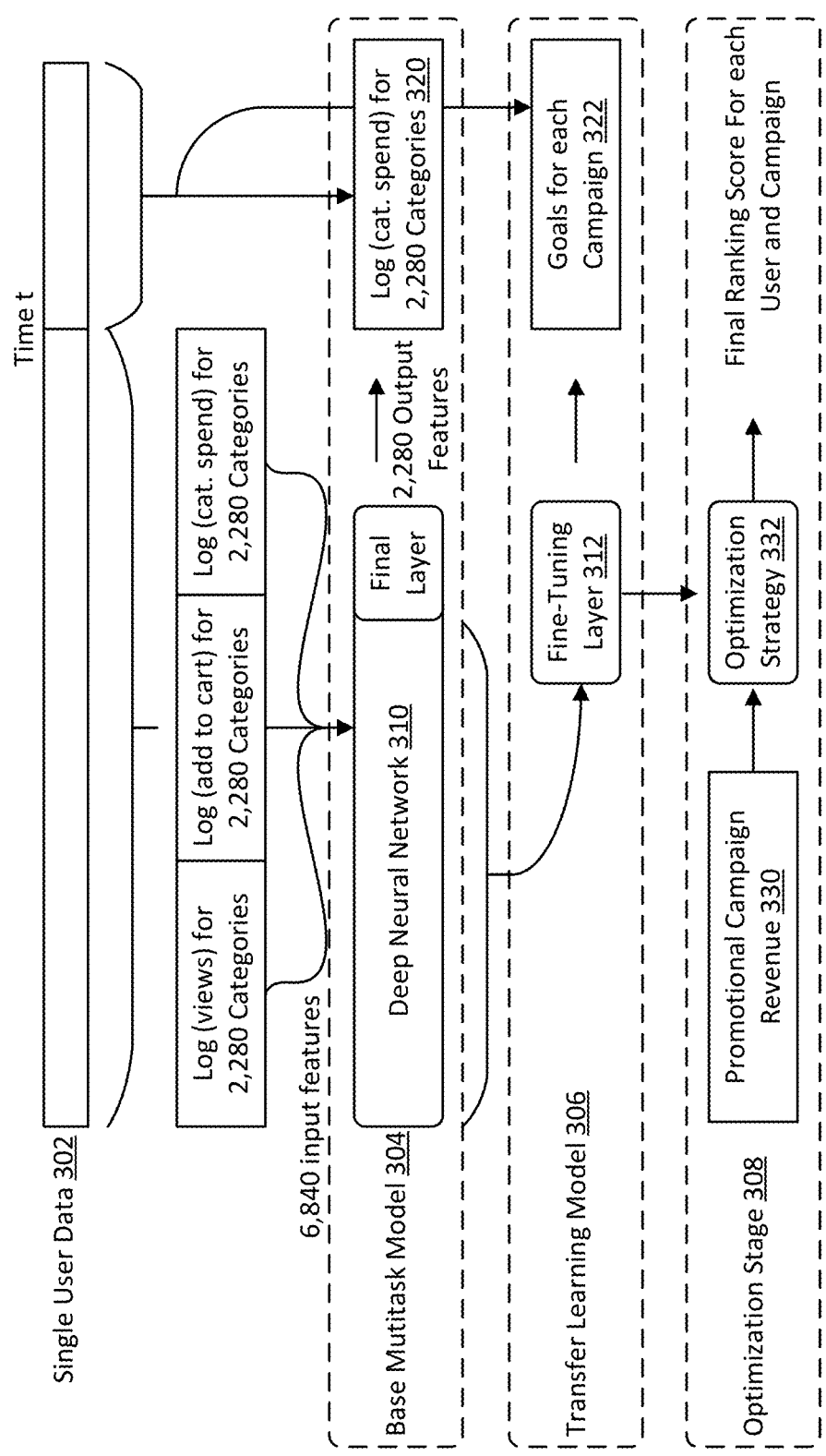
FIG. 4 illustrates an architecture of a promotion optimization application that may be executed to generate optimized promotion recommendations, according to an example embodiment.

FIG. 4 illustrates an architecture 300 of a promotion optimization application that may be executed to generate optimized promotion recommendations, according to an example embodiment. In particular, FIG. 4 illustrates a proposed model of transfer learning on multitask neural networks.

In the example shown, a dataset 302 is received, for training and experimentation. A time threshold t is selected to separate the dataset. Data before time t corresponds to model input and data after time t corresponds to model output.

In the model as built, inputs and outputs of the model are similarly generated at all stages. Input and output behaviors (product views, adds to cart, and purchases) are transformed into a single feature vector for each customer. In the example shown that is applied in the experiments of FIGS. 6-9, below, the feature vector columns correspond to propensity scores for 2,280 fine-grained categories such as "air hockey" or "robes." To calculate propensity scores, a user's activity in each category during the input/output data period is combined. Further details are described below in conjunction with the Experimental Results derived using a particular example dataset. While feature engineering is likely domain-specific, it should strike a balance in granularity between wanting specificity (more features) and avoiding sparsity (fewer features).

As shown in FIG. 4, the architecture 300 includes three stages. First, a multitask model stage 304 is used. The multitask model stage 304 includes a deep neural network 310 that uses the input feature vector X (based on data before time t) to predict the output feature matrix Y (based on data after time t) for each of the customers to provide a base multitask model. A single value $X_{u,i}$ represents customer u's input score for feature (category) i. The output matrix Y is similarly constructed. This model is trained on a large dataset using the loss function:

$$\text{Loss}(X, Y) = \frac{1}{MK} \sum_{u=1}^{M} \sum_{i=1}^{K} (f(X_{ui}) - Y_{ui})^2$$

Where M is total number of customers, K is number of categories (tasks) being predicted, and f (Xui) is the output of the neural network f for customer u and task (category) i given input Xui. The neural network incorporates an embedding layer for each input feature and it is multi-task in that it simultaneously predicts the entire output feature space (for the example datasets herein, this corresponds to each category score).

A transfer learning stage 306 modifies the base multitask model. The base multitask model trained in the multitask model stage 304 is not specific to an advertising campaign. In this stage, a fine tuning layer 312 is applied to the deep neural network 310 based on a set of one or more goals 322 for a given campaign, to predict the specific set of categories, brands, or products involved in a promotion. To do so, the final task- (category-) specific layer of the deep neural network 310 is removed, and a new layer is retrained to predict the campaign specific output variables. This training data will typically be sales in those specific campaign related products.

An optimization stage 308 next determines an appropriate set of promotions for one or more users. The transfer learning stage 306 generally does not consider sponsorship revenue from a brand to the retailer for a promotion. In this stage, advertising campaigns are selected for each customer to balance total revenue, which is the sum of retail revenue (from the customer) which is obtained by the modified model, and promotional revenue 330 (from the sponsor). To do so, an optimization strategy 332 is selected. In a particular embodiment, the optimization strategy 332 utilizes a model to maximize total revenue conditioned on customer trust. For example, the yield equation described above in conjunction with FIG. 3 can be used. The model produces a single expected value for each advertising campaign that elegantly balances promotional revenue, retail revenue, and trust. Thus, a retailer may select a τ corresponding to their desired level of user trust and calculate the values of o for each user u and promotional campaign i and assign users to campaigns according to certain business rules (e.g. a required number of ad impressions).

In this context, rather than simply considering profit, the optimization considers promotional revenue, and rather than a predicted rating, the model uses product propensity scores. Thus, the optimization maximizes promotional revenue constrained on some level of accurate predicted product propensity. In the specific dataset described below, product propensity is calculated as a consumer's log(revenue) for some product. Thus, the "trust" component of the formulation serves to place importance on both a) retail revenue and b) trust (by suggesting things a user views as consistent with their shopping behavior).

Example System

Figure 5:
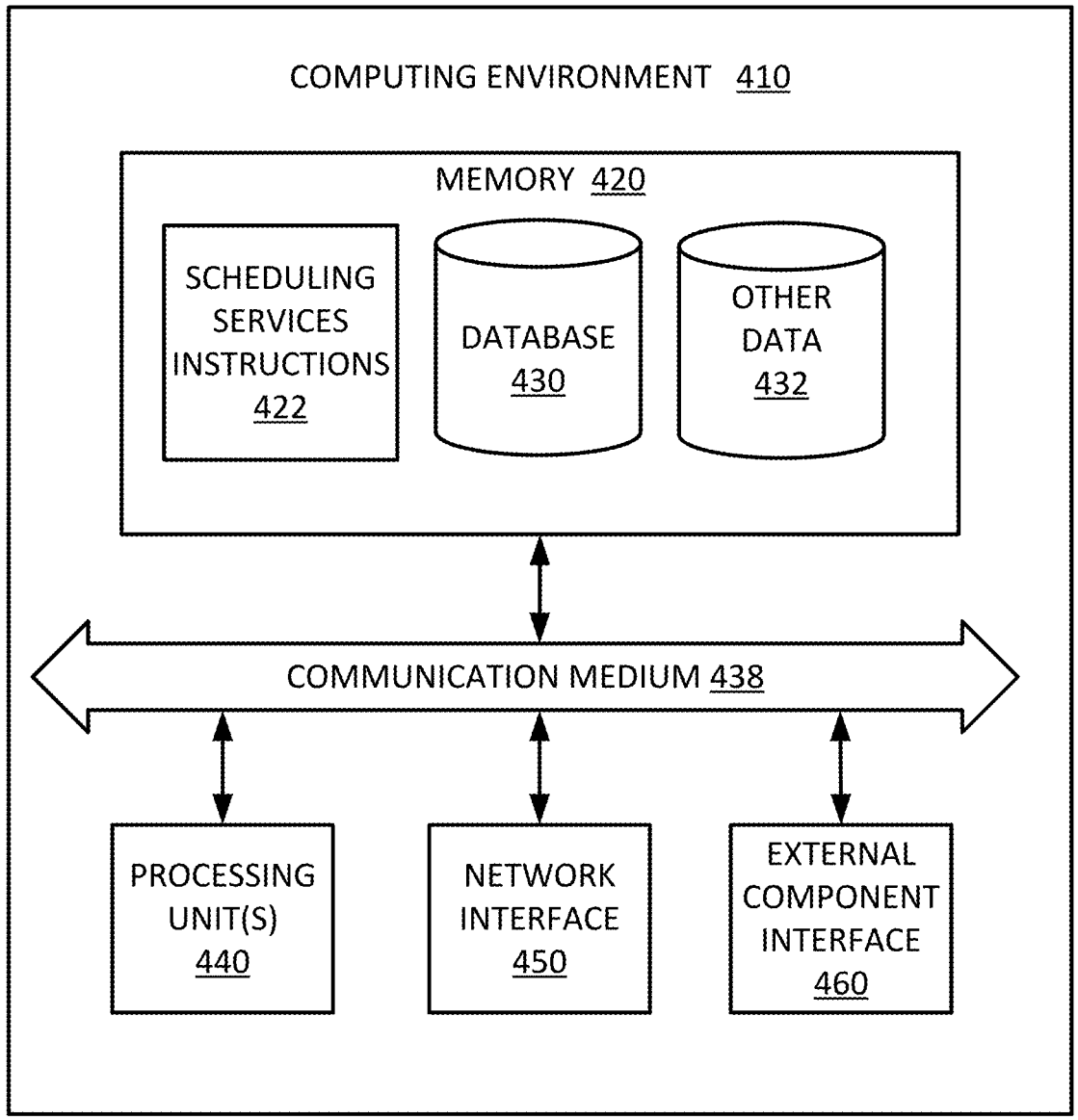
FIG. 5 illustrates an example system with which disclosed systems and methods can be used.

FIG. 5 illustrates an example system 400 with which disclosed systems and methods can be used. In an example, the system 400 can include a computing environment 410. The computing environment 410 can be a physical computing environment, a virtualized computing environment, or a combination thereof. The computing environment 410 can include memory 420, a communication medium 438, one or more processing units 440, a network interface 450, and an external component interface 460.

The memory 420 can include a computer readable storage medium. The computer storage medium can be a device or article of manufacture that stores data and/or computer-executable instructions. The memory 420 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 420 can store various types of data and software. For example, as illustrated, the memory 420 includes instructions 422 for implementing one or more aspects of the promotion optimization processes described herein, database 430, as well as other data 432 (e.g., user data, such as user purchase data). In some examples the memory 420 can include instructions for generating a website and/or maintaining product information).

The communication medium 438 can facilitate communication among the components of the computing environment 410. In an example, the communication medium 438 can facilitate communication among the memory 420, the one or more processing units 440, the network interface 450, and the external component interface 460. The communication medium 438 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 440 can include physical or virtual units that selectively execute software instructions. In an example, the one or more processing units 440 can be physical products comprising one or more integrated circuits. The one or more processing units 440 can be implemented as one or more processing cores. In another example, one or more processing units 440 are implemented as one or more separate microprocessors. In yet another example embodiment, the one or more processing units 440 can include an application-specific integrated circuit (ASIC) that provides specific functionality. In yet another example, the one or more processing units 440 provide specific functionality by using an ASIC and by executing computer-executable instructions.

The network interface 450 enables the computing environment 410 to send and receive data from a communication network (e.g., network 20). The network interface 450 can be implemented as an Ethernet interface, a token-ring network interface, a fiber optic network interface, a wireless network interface (e.g., WI-FI), or another type of network interface.

The external component interface 460 enables the computing environment 410 to communicate with external devices. For example, the external component interface 460 can be a USB interface, a Lightning interface, a serial port interface, a parallel port interface, a PS/2 interface, and/or another type of interface that enables the computing environment 410 to communicate with external devices. In various embodiments, the external component interface 460 enables the computing environment 410 to communicate with various external components, such as external storage devices, input devices, speakers, modems, media player docks, other computing devices, scanners, digital cameras, and fingerprint readers.

Although illustrated as being components of a single computing environment 410, the components of the computing environment 410 can be spread across multiple computing environments 410. For example, one or more of instructions or data stored on the memory 420 may be stored partially or entirely in a separate computing environment 410 that is accessed over a network.

EXPERIMENTS

Marketing campaign managers engage in audience selection, i.e., the process of identifying a set of customers for a given advertising campaign. Ideally, an audience should maximize overall revenue (retail revenue and promotional revenue). The rank ordering of guest/campaign pairings is crucial to the success of the campaign. Campaign managers may seek to choose between two users for a campaign, while ad platform operators may seek to choose between two ads for a user.

Referring to FIGS. 6-9, various experimental results are shown that illustrate the effectiveness of the multitask transfer learning approach described herein within the context of promotion selection for a particular user, using a dataset containing a sample of customer product purchases, views, and adds to cart from a large retailer as training and test data. The dataset spans six months. Thus, the input variables corresponds to five months of data and the output variables corresponds to one month of data. In particular, experiments were performed using two datasets: the Bonn Furniture Styles Dataset and a Furniture Collections dataset.

The feature encoding process used to execute the experiment corresponds to that seen in FIG. 4. In particular, let C be a 1/0 encoded matrix representing the product to category memberships where $C_{i,j}$ is a 1 if product i is a member of category j and 0 otherwise. Let v be a vector of prices where $v_i$ gives the price for product i. Given user u's ith interaction in the dataset $p_{u,i}$ is the product the user interacted with and $t_{u,i}$ is the index of the interaction type (0=view, 1=add to cart, 2=buy).

Given this formulation, the raw feature encoding $X_u$ for user u is the sum of the 1/0 category vector encodings for each product the user interacted with, weighted by the product prices and interaction type weights:

$$X_u = \sum_{i=1}^{n} w_{t_{u,i}} v_{p_{u,i}} C_{p_{u,i}}$$

In this context, C is an encoded matrix representing a product to category membership, v is a vector of prices, where $v_i$ represents a price for a particular product, $p_{u,i}$ represents a user's ith interaction with a product, and $t_{u,i}$ represents an index of an interaction type, $w_{t_{u,i}}$ is a vector of product prices, and $v_{p_{u,i}}$ is a vector of interaction weights.

The normalized feature encoding $X'_u$ data is created by log-transforming $X_u$ and rescaling it so all values fall between 0 and 1, as follows:

$$X'_u = \frac{\log(1 + X_u)}{\max \log(1 + X_u)}$$

In the experiments described herein, ranking accuracy of an algorithm is assessed by ordering (promotion, user) pairs according to their $o_{u,i}$ value in the training dataset (before time t), grouping those pairs into deciles, and reporting various measures for each decile in the testing dataset (after time t). In FIGS. 6-9, d corresponds to a decile bin number and $F_{model}(d)$ and $F_{rand}(d)$ are a cumulative distribution function (CDF) of a model and CDF of random assignment.

Additionally, in FIGS. 6-9, the evaluation compares five different methods:
  Customer Segmentation (CS): This is the traditional method used by marketing managers. In this method, marketing managers come up with rules that define segments. In the experiments conducted, the CS algorithm uses rules that emulate common marketing rules. For example, customers who have spent $50 or more in a given category.
  Single task neural networks (ST): Single task neural networks focus on one task and do not optimize between different competing tasks. This has one output node in the neural network (associated with the target promotional campaign). As many different networks as there are promotional campaigns are constructed.
  Multitask neural networks without transfer learning (MT): This method is direct extension of the previous method, with one network optimizing for all the campaigns simultaneously.
  Multitask neural networks with transfer learning (MT-TL): This method includes the first two steps of the full process described herein. First a generic multi-task network is trained for predicting the most granular categories. Then, output nodes are replaced by campaign specific output nodes and the network is fine tuned for new set of outputs.

Yield maximization using Multitask neural networks with transfer learning (YM-MT-TL): This method adds a third stage to the MT-TL process by generating trust-based scores as described earlier (e.g., in conjunction with FIG. 3, step 208. By doing so it maximizes not only customer retail revenue but also ad revenue and trust.

Experimental Results

Figure 6:
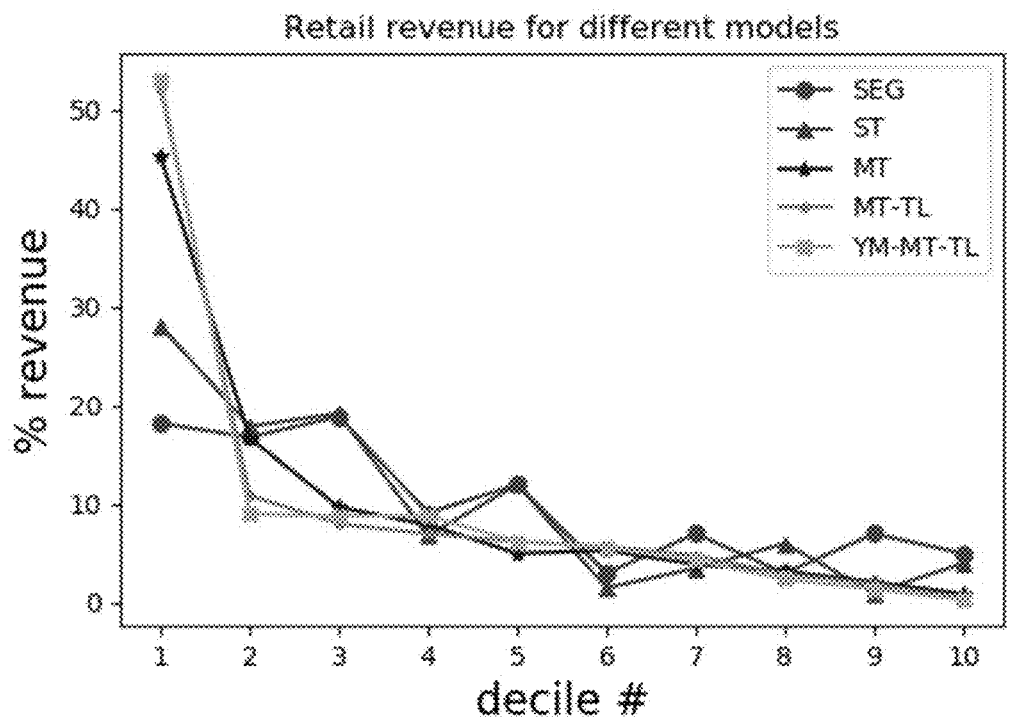
FIG. 6 shows retail revenue, by decile, in an example experiment comparing outcomes of various promotion recommendation systems.
Figure 7:
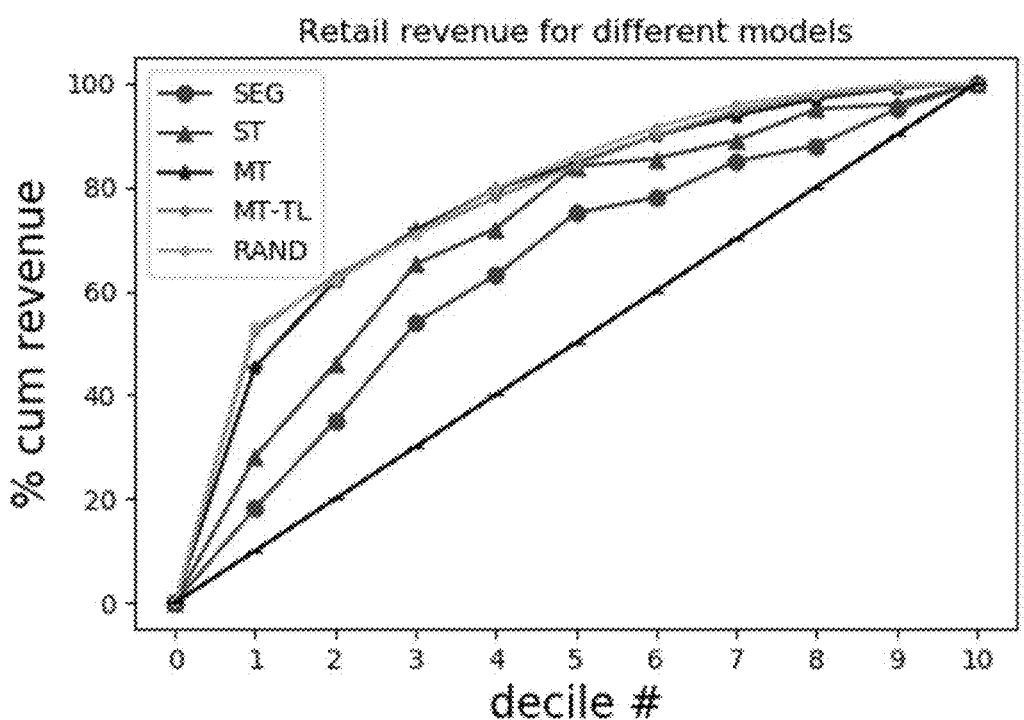
FIG. 7 shows retail revenue, cumulative by decile, in an example experiment comparing outcomes of various promotion recommendation systems.

FIG. 6 illustrates a chart 500 that shows retail revenue, by decile, in the example experiment described above, comparing outcomes of various promotion recommendation systems. FIG. 7 illustrates a chart 600 that shows retail revenue, cumulative by decile, in the same experiment, comparing outcomes of various promotion recommendation systems.

As seen therein, a segmentation method (SEG) ranks customers who have affinity to buy items from campaign higher than those who do not. However, it can be seen that rank ordering is imperfect. For example, there is a significant % of retail revenue in lower deciles. Similar trends appear for the single task neural networks (ST), but rank ordering is slightly better.

Compared to these baseline models, the multitask neural network (MT) has better rank ordering and captures as much as 46% of revenue in first decile itself. Also, rank ordering is very smooth by capturing 65% of the revenue in top 3 deciles. The multitask transfer learning metric (MT-TL) performs even better, with 52% of the revenue falling in the top decile.

To quantify the overall ranking performance of each algorithm, we calculated the Kolmogorov Smirnov (KS) statistic. The KS statistic calculates, across all rankings, the maximum gap between an algorithm's cumulative value up to that ranking and the cumulative value for a ranking. Visually, this corresponds to the maximum vertical distance between the straight horizontal line and a particular algorithm's line in FIG. 7. The KS statistic for different methods is shown in Table 1, below:

TABLE 1

| | KS Statistic | | | |
|---|---|---|---|---|
| Model | SEG | ST | MT | MT-TL |
| KS | 25.1 | 35.3 | 39.6 | 43.2 |

As seen in Table 1, the MT-TL method performs better than all other methods, indicating that it places high spending customers in the top decile and has the highest concentration of high spending customers as compared random assignment.

Figure 8:
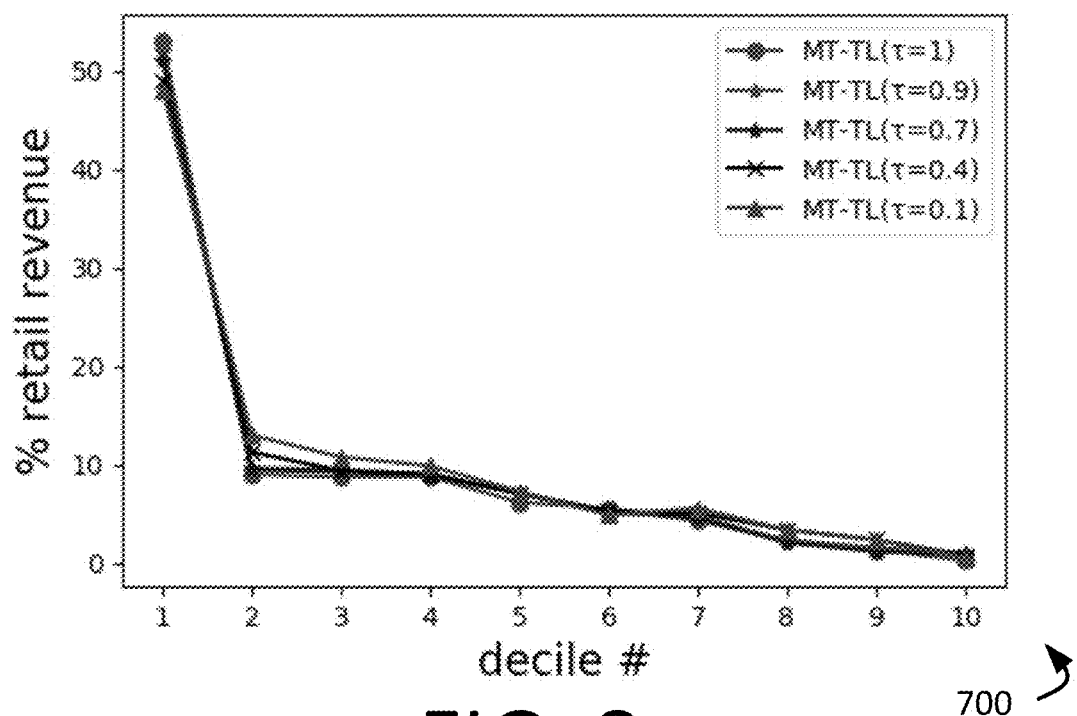
FIG. 8 shows retail revenue, by decile, in an example experiment comparing outcomes of various multitask transfer learning recommendation systems adopting different weighting of ad revenue balanced against retail revenue.

However, because certain types of entities are not just interested in retail revenue, scores were then optimized from MT-TL for maximizing the total yield (retail revenue+ad revenue) by applying the optimization equation described above. The $\tau$ value in that equation varies from only weight placed on retail revenue ($\tau$=1.0) to only weight placed on ad revenue ($\tau$=0.1). FIG. 8 shows a chart 700 that illustrates how retail is relatively unchanged as $\tau$ varies, perhaps because of differences in scale between ad and retail revenue.

Figure 9:
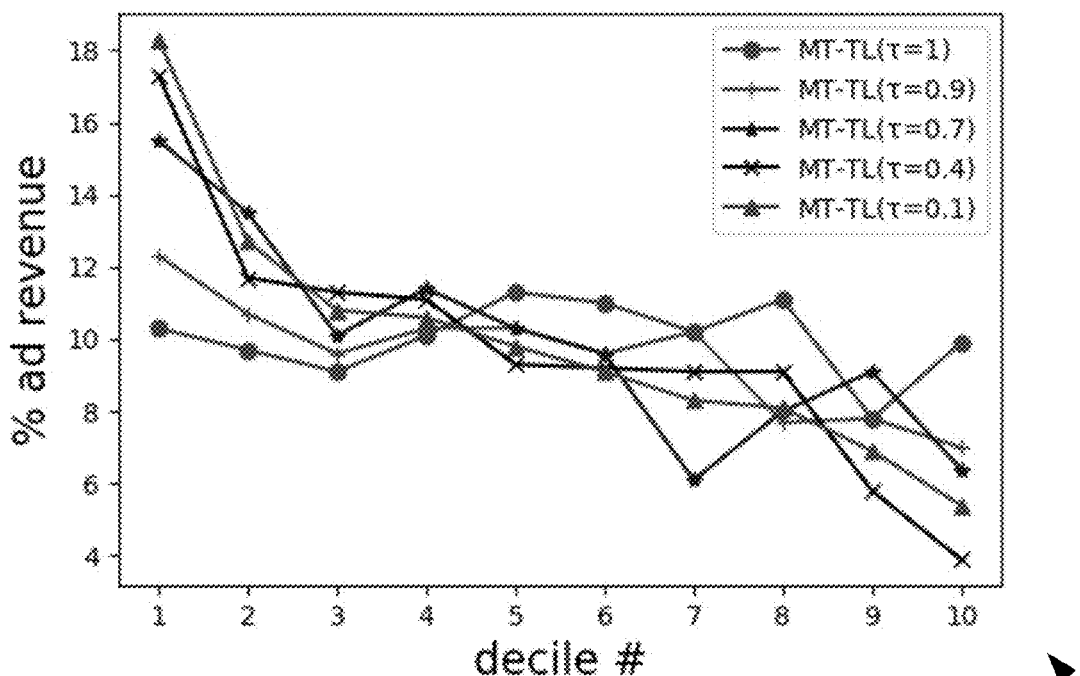
FIG. 9 shows retail revenue, cumulative by decile, in an example experiment comparing outcomes of various multitask transfer learning recommendation systems adopting different weighting of ad revenue balanced against retail revenue.

FIG. 9 illustrates a chart 800 of ad revenue at each decile for each level of $\tau$. In chart 900, it can be seen that without performing optimization for ad revenue (MT-TL, $\tau$=1), ad revenue is more or less flat across deciles. Whereas, when $\tau$=0.1, ad revenue across deciles decreases monotonically. For $\tau$=0.7 or $\tau$=0.4, a more reasonable rank ordering appears. It is expected that platforms implementing the systems described herein will provide for a tunable experience by allowing marketing managers to adjust the value of $\tau$, and it is expected that such users will pick the best value of $\tau$ which leads to expected levels of retail/ad revenues for a given marketing campaign.

SUMMARY

Referring to FIGS. 1-9 generally, an evolution of methods is reviewed, starting from single task neural network for modeling each of a set of promotional campaign separately. A multitask (predicting different campaign affinities simultaneously) network with transfer learning and yield maximization is proposed, and compared to similar systems without transfer learning or yield maximization. Incremental benefits are provided by using each of these methods. Accordingly, the methods and systems described herein may be used to improve efficiency in automatically providing promotions for each of a plurality of known customers, e.g., in realtime on a retailer website, so as to maximize retailer profits without sacrificing customer trust.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:
1. A computer-implemented method comprising:
training a base model with existing customer records describing purchases within an item collection having a plurality of categories, the existing customer records being associated with items across the plurality of categories, the base model comprising a neural network, wherein the base model is trained on a dataset according to a loss function:

$$\text{Loss}(X, Y) = \frac{1}{MK} \sum_{u=1}^{M} \sum_{i=1}^{K} (f(X_{ui}) - Y_{ui})^2$$

wherein M is a total number of customers, K is a number of categories being predicted, and f($X_{ui}$) is an output of a neural network f for customer u and category i given an input $X_{ui}$;

tuning the base model for at least one specific promotion task via a transfer learning process to generate relevancy predictions for one or more of the plurality of categories, the relevancy predictions being specific to a particular user; and combining the relevancy predictions and advertising revenue to estimate overall performance of the at least one specific promotion task.

2. The computer-implemented method of claim 1, wherein the base model has an input feature vector X and an output feature matrix Y, wherein each of a plurality of values in the input feature vector X corresponds to a score for a customer associated with a particular product category, and wherein each of a plurality of values in the output feature matrix Y corresponds to a purchase propensity score.

3. The computer-implemented method of claim 2, wherein the input feature vector X for a particular customer u is given by:

$$X_u = \sum_{i=1}^{n} w_{t_{u,i}} v_{p_{u,i}} C_{p_{u,i}}$$

wherein C is an encoded matrix representing a product to category membership, v is a vector of prices, where $v_i$ represents a price for a particular product, $p_{u,i}$ represents a user's ith interaction with a product, and $t_{u,i}$ represents an index of an interaction type, $w_{t_{u,i}}$ is a vector of product prices, and $v_{p_{u,i}}$ is a vector of interaction weights.

4. The computer-implemented method of claim 1, wherein tuning the base model comprises removing a final layer of the base model and retraining a new final layer to predict campaign-specific sales.

5. The computer-implemented method of claim 1, wherein combining the relevancy predictions and advertising revenue to estimate overall revenue comprises optimizing total revenue by selecting one or more advertising campaigns for each customer to balance total revenue.

6. The computer-implemented method of claim 5, wherein total revenue comprises a sum of retail revenue from a customer and promotional revenue from a sponsor.

7. The computer-implemented method of claim 5, wherein total revenue is derived from an overall yield equation:

$$o_{u,i} = p_{u,i} \sqrt{\frac{\left(\frac{1}{\tau^2} - 1\right) \sum_j \hat{y}_{u,i}^2}{\sum_j p_{u,j}^2} + \frac{\hat{y}_{u,i}}{\tau}}$$

wherein $\hat{y}_{u,i}$ represents a score generated by a second stage transfer model, $p_{u,i}$ is constant for a user u and promotional campaign i, and $\tau$ is a selectable constant.

8. The computer-implemented method of claim 1, wherein the at least one specific promotion task corresponds to a particular brand or particular category from among the plurality of categories.

9. The computer-implemented method of claim 1, wherein the existing customer records include records of item views, additions of items to a shopping cart, and category spend for each of a plurality of users.

10. The computer-implemented method of claim 1, further comprising, based on the estimate of overall performance, implementing the at least one specific promotion task.

11. A promotion generation system comprising:
a computing system including a processor operatively coupled to a memory subsystem, the memory subsystem storing customer records and instructions which, when executed, cause the computing system to:
train a base model with the customer records, the customer records describing purchases within an item collection having a plurality of categories and being associated with items across the plurality of categories, the base model comprising a neural network, wherein the base model is trained on a dataset according to a loss function;

$$\text{Loss}(X, Y) = \frac{1}{MK} \sum_{u=1}^{M} \sum_{i=1}^{K} (f(X_{ui}) - Y_{ui})^2$$

wherein M is a total number of customers, K is a number of categories being predicted, and f($X_{ui}$) is an output of a neural network f for customer u and category i given an input $X_{ui}$;

tune the base model for at least one specific promotion task via a transfer learning process to generate relevancy predictions for one or more of the plurality of categories, the relevancy predictions being specific to a particular user; and combine the relevancy predictions and advertising revenue to estimate overall revenue.

12. The promotion generation system of claim 11, wherein the computing system is further configured to automatically identify one or more recommended promotions and transmit an identifier of the one or more recommended promotions to a retail website.

13. The promotion generation system of claim 11, wherein the computing system is communicatively connected to a retailer website, and wherein the instructions cause the computing system to:
identify the at least one specific promotion task from among a plurality of different promotion task candidates as an optimized promotion task to be presented to a particular customer based on the customer records; and
automatically present to the particular customer a promotion in accordance with the at least one specific promotion task via the retailer website.

14. The promotion generation system of claim 13, wherein each of the plurality of different promotion task candidates is assessed relative to at least the particular customer to identify the at least one specific promotion task.

15. The promotion generation system of claim 11, wherein the computing system is communicatively connected to a retailer website, and wherein the instructions cause the computing system to:
identify the particular customer to present a promotion corresponding to the at least one specific promotion task as an optimized promotion task, the particular customer being identified from among a plurality of customers; and automatically present to the particular customer a promotion in accordance with the at least one specific promotion task via the retailer website.

16. The promotion generation system of claim 11, wherein identifying the particular customer comprises optimizing total revenue by selecting one or more advertising campaigns for each customer to balance total revenue.

17. A promotion generation system comprising:
a computing system including a processor operatively coupled to a memory subsystem, the memory subsystem storing customer records and instructions which, when executed, cause the computing system to:
train a base model with the customer records, the customer records describing purchases within an item collection having a plurality of categories and being associated with items across the plurality of categories, the base model comprising a neural network, wherein the base model is trained on a dataset according to a loss function;

$$Loss(X, Y) = \frac{1}{MK} \sum_{u=1}^{M} \sum_{i=1}^{K} (f(X_{ui}) - Y_{ui})^2$$

wherein M is a total number of customers, K is a number of categories being predicted, and $f(X_{ui})$ is an output of a neural network f for customer u and category i given an input $X_{ui}$;
tune the base model for at least one specific promotion task via a transfer learning process to generate relevancy predictions for one or more of the plurality of categories, the relevancy predictions being specific to at least one particular user;
combine the relevancy predictions and advertising revenue to estimate overall revenue associated with the at least one particular user and the at least one specific promotion task; and
transmit an instruction to an online retail platform to automatically present a promotion associated with the at least one specific promotion task to the at least one particular user.

18. The promotion generation system of claim 17, further comprising the online retail platform, wherein the online retail platform comprises at least one of a retail website server and a mobile application server.

19. The promotion generation system of claim 17, wherein the customer records are associated with a plurality of customers including the at least one particular user.

20. A computer-implemented method comprising:
training a base model with existing customer records describing purchases within an item collection having a plurality of categories, the existing customer records being associated with items across the plurality of categories, the base model comprising a neural network, wherein:
the base model has an input feature vector X and an output feature matrix Y, wherein each of a plurality of values in the input feature vector X corresponds to a score for a customer associated with a particular product category, and wherein each of a plurality of values in the output feature matrix Y corresponds to a purchase propensity score; and
the input feature vector X for a particular customer u is given by:

$$X_u = \sum_{i=1}^{n} w_{t_{u,i}} v_{p_{u,i}} C_{p_{u,i}}$$

wherein C is an encoded matrix representing a product to category membership, v is a vector of prices, where $v_i$ represents a price for a particular product, $p_{u,i}$ represents a user's ith interaction with a product, and $t_{u,i}$ represents an index of an interaction type, $w_{t_{u,i}}$ is a vector of product prices, and $v_{p_{u,i}}$ is a vector of interaction weights;
tuning the base model for at least one specific promotion task via a transfer learning process to generate relevancy predictions for one or more of the plurality of categories, the relevancy predictions being specific to a particular user; and
combining the relevancy predictions and advertising revenue to estimate overall performance of the at least one specific promotion task.

21. A computer-implemented method comprising:
training a base model with existing customer records describing purchases within an item collection having a plurality of categories, the existing customer records being associated with items across the plurality of categories, the base model comprising a neural network;
tuning the base model for at least one specific promotion task via a transfer learning process to generate relevancy predictions for one or more of the plurality of categories, the relevancy predictions being specific to a particular user; and
combining the relevancy predictions and advertising revenue to estimate overall performance of the at least one specific promotion task, wherein combining the relevancy predictions and advertising revenue to estimate overall revenue comprises optimizing total revenue by selecting one or more advertising campaigns for each customer to balance total revenue wherein total revenue is derived from an overall yield equation:

$$o_{u,i} = p_{u,i} \sqrt{\frac{\left(\frac{1}{\tau^2} - 1\right) \sum_j \hat{y}_{u,i}^2}{\sum_j p_{u,j}^2}} + \frac{\hat{y}_{u,i}}{\tau}$$

wherein $\hat{y}_{u,i}$ represents a score generated by a second stage transfer model, $p_{u,i}$ is constant for a user u and promotional campaign i, and $\tau$ is a selectable constant.

* * * * *